May 8, 1928.
E. G. McCAULEY
1,668,971
SCREW MECHANISM FOR ADJUSTABLE AND REVERSIBLE PITCH PROPELLERS
Filed April 30, 1923    2 Sheets-Sheet 1
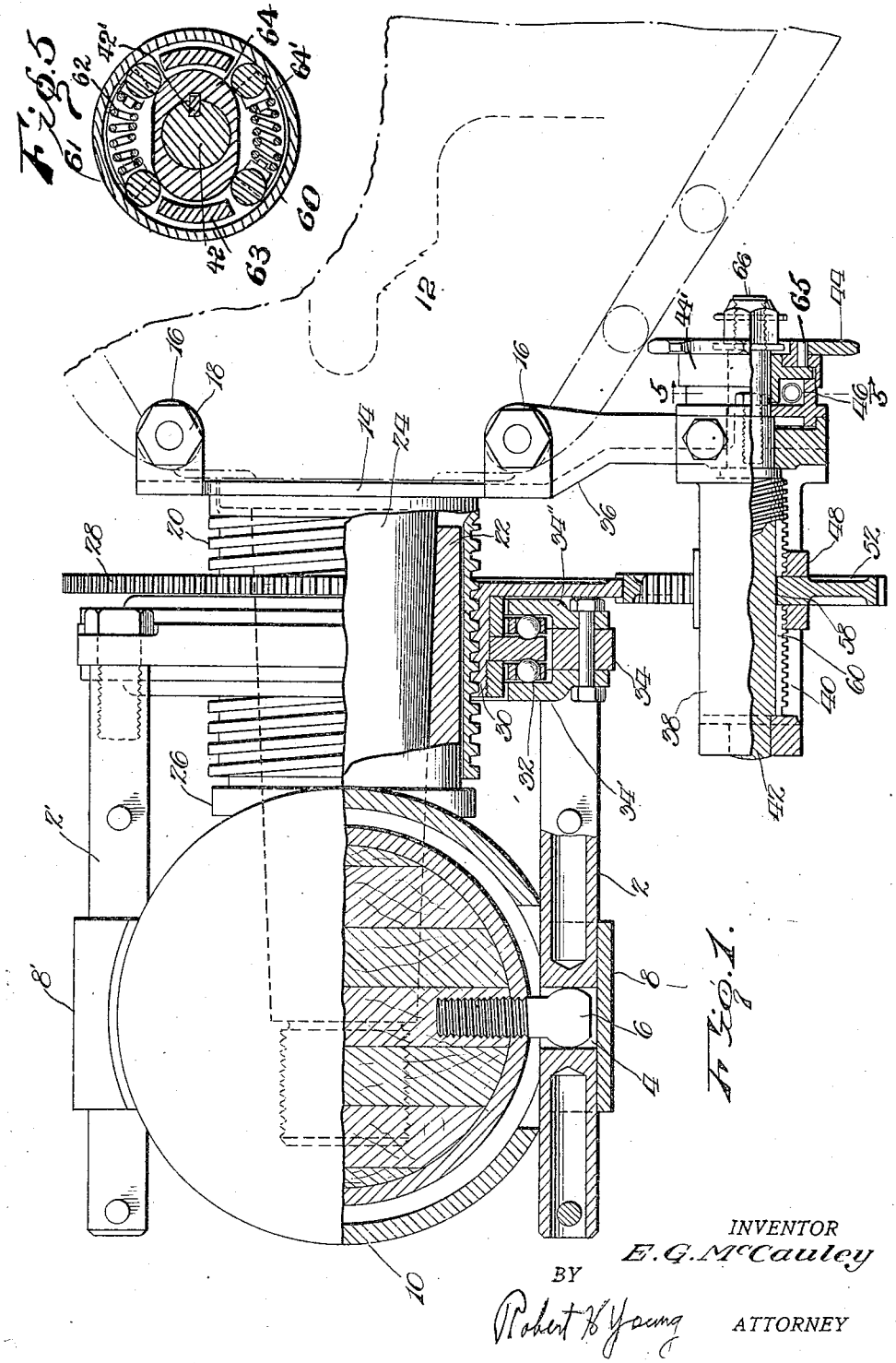
INVENTOR
*E. G. McCauley*
BY
*Robert B. Young*   ATTORNEY May 8, 1928.
E. G. McCAULEY
1,668,971
SCREW MECHANISM FOR ADJUSTABLE AND REVERSIBLE PITCH PROPELLERS
Filed April 30, 1923  2 Sheets-Sheet 2
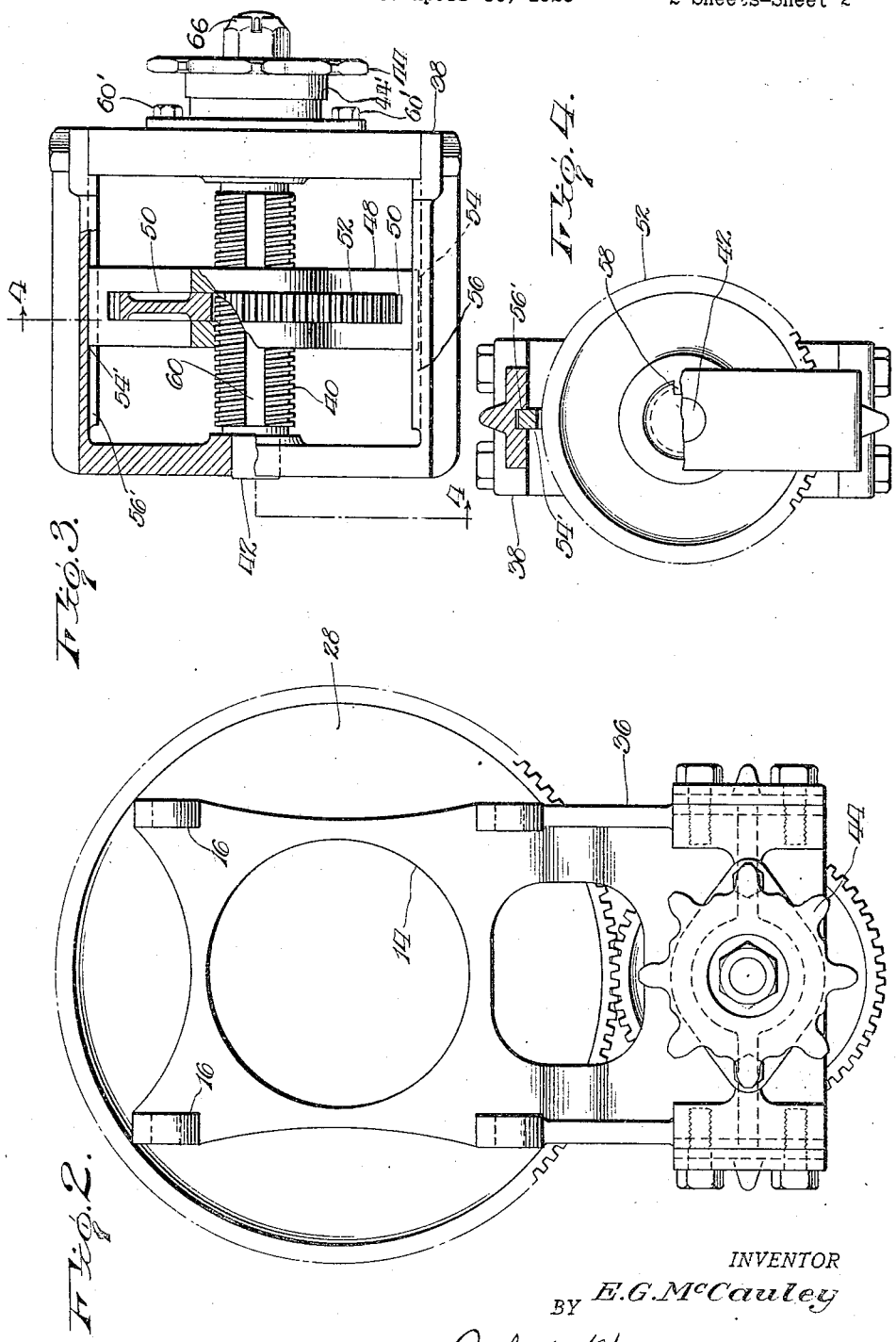
INVENTOR
BY E.G.McCauley
Robert N Young   ATTORNEY Patented May 8, 1928.

1,668,971

UNITED STATES PATENT OFFICE.

ERNEST G. McCAULEY, OF DAYTON, OHIO.

SCREW MECHANISM FOR ADJUSTABLE AND REVERSIBLE PITCH PROPELLERS.

Application filed April 30, 1923. Serial No. 635,818.

This invention relates to what are generally known as reversible and adjustable pitch propellers and has particular reference to operating mechanism therefor.

It is an object of the invention to provide a positive mechanical mechanism that will be self-locking, holding the propeller blades in any pitch relation to which they may be positioned and from which they may be readily and quickly changed.

Further objects will become apparent from the description and claims and from the drawing, in which:—

Fig. 1 is a top plan view, part in section, of a type of control mechanism in accordance with the invention.

Fig. 2 is a rear elevation thereof, looking from the right of Fig. 1.

Fig. 3 is a side elevation of a part of the mechanism, showing a portion in section, and Fig. 4 is a front elevation thereof, part in section, taken along the line 4—4 of Fig. 3.

Fig. 5 is a sectional view of a clutch mechanism taken on the line 5—5 of Fig. 1.

In my co-pending application, Serial #635,817, filed April 30, 1923, I have disclosed mechanism for changing the angularity of propeller blades similar to that shown in Fig. 1 hereof. This mechanism, in brief, consists of slide links 2, 2' slotted, as at 4 to engage operating pins such as 6, secured in the blade of the propeller and slide link guides 8, 8' secured to a hub member 10.

The propeller control mechanism to be described is designed to operate the mechanism above referred to and consists of primary and secondary driven members advanced or retracted simultaneously in a predetermined relation. To a stationary element such as prime mover frame 12 a bracket 14 is rigidly secured such as by lugs 16 and fastening means 18. The bracket 14 is integral with a stationary worm screw 20 and both are adapted to permit passage of a shaft sleeve 22 which is splined or otherwise secured on prime mover shaft 24. The shaft sleeve 22 is rigidly secured to the hub 10 and may be provided with a collar 26 if desired. A gear 28 mounted upon the worm screw 20 is provided with an extended projection 30 and is internally threaded to fit the threads of the worm screw 20 to drive itself forward or backward thereby upon rotation. The exterior portion of the projection 30 is adapted to secure a radial thrust bearing 32, carrying a yoke member 34 and races 34', 34'', connected with the slide links 2, 2', rotatably thereon. It is now apparent that as the gear 28 is revolved, it will travel forward or backward carrying the yoke 34 and slide links 2, 2', with it, thereby varying the angular relation of the blades simultaneously. The gear 28 is considered herein to be the secondary driven means.

A portion 36 of the bracket 14 is extended to one side to support a frame 38 in which is rotatably mounted worm screw 40 on an axle 42 and adapted to be driven by a sprocket 44 through a self-locking clutch 46. This clutch mechanism is illustrated in Fig. 5 comprising a fixed cage 60'' mounted on the bracket 36 and held rigid by screws 60'. This cage forms a bearing for mounting the axle 42 and likewise an outer race for a plurality of balls 61.

These balls 61 are wedgingly held between the fixed cage 60'' and the rotatable cam member 64 by expansion springs 62. The cam 64 is mounted on axle 42 and keyed to same by key 42'. A sprocket member 44 jointed to a casing 44' by means of a pin 65 is rotatably mounted on cage 60''. The casing 44' is provided with ejectors 63 extending past the flange 64' of the cam member 64 and in front of the balls 61. The whole clutch mechanism is held on the axle 42 by a nut 66.

It is apparent that when a turning force is applied to the axle 42 from the propeller side in either direction, the cam 64 will be locked by means of the balls 61 and cage 60'' thus preventing any movement of the axle 42.

When the sprocket is rotated from the operator's side the ejectors 63 will press against the balls 61 and compress the springs 62 thus unlocking the wedging action of the cam in one direction. Further movement of sprocket will cause the ejectors 63 to engage the flange 64' and thus turn the cam 64 and axle 42 to thus change the pitch of the blades as desired.

Mounted on screw 40 and having threads to be driven forwardly or backwardly thereby, is a double nut or yoke 48, recessed as at 50 to receive a gear 52 therein and provided with longitudinal guides 54, 54' fitting in guide ways 56, 56'. The gear 52 is meshed with gear 28 and driven by means of a lug 58 integral therewith sliding longitudinally in a slot 60 cut in the worm 40. Upon rotative movement of the sprocket 44, the nut 48 is driven longitudinally of the screw 40, causing the gear 52 to move longitudinally and to revolve, yet retaining it in mesh with gear 28, due to proper proportioning of the gear and worm screw ratios. In the present case the gears 28 and 52 and the worms 20 and 40 are in the ratios of 2 to 1, respectively.

The sprocket 44 is driven by any suitable means under control of a manipulator and may be replaced by any other means for the same purpose. The operation of the adjusting mechanism being apparent from the above description it will not be set forth specifically.

What I claim and desire to secure by Letters Patent is:—

1. A reversible and adjustable propeller control mechanism comprising primary and secondary driven elements, a frame support therefor, said secondary element being adapted to vary the angularity of the blades of said propeller and to be driven rotatively and longitudinally of its axis, said primary element being disposed in juxtaposed relation to said secondary element carried by the supporting frame and adapted to be driven rotatively and longitudinally of its axis, driving means between said primary and secondary elements, means for driving said elements in predetermined driving relation, and means for driving said primary element, said means preventing said primary element from being driven from said secondary element.

2. A propeller control mechanism, comprising connections to a propeller having a plurality of blades, means for adjusting said blades by a revoluble adjusting member, means for operating said revoluble adjusting member, and means for automatically locking or releasing said operating means, said means for automatically locking and releasing said operating means, consisting of a ball or roller clutch as described.

3. In a propeller control mechanism, comprising a propeller having a plurality of adjustable blades, a primary gear driver and a secondary gear driven member meshing therewith, primary and secondary screw threaded members, upon which said primary and secondary gear members rotate and move longitudinally, connections from said secondary gear member to said adjustable blades having anti-friction bearings interposed between said connections, means for rotating said primary screw threaded member to advance or retract in predetermined simultaneous relation said primary gear member and said secondary gear member, and means for locking said primary screw threaded member against rotation in either direction when the primary gear is driven by the secondary gear due to thrust forces exerted on the blades.

4. A propeller control mechanism comprising a screw threaded stationary sleeve, a screw threaded gear member to revolve and move longitudinally on said screw threaded stationary sleeve, a screw threaded shaft revolubly mounted and disposed parallel to said screw threaded stationary sleeve, a screw threaded nut adapted to move longitudinally along said screw threaded shaft, and drive a gear pinion slidably mounted on said screw threaded shaft in meshing relation with said first mentioned gear member, said pinion adapted to revolve and move longitudinally of its axis in predetermined relation to said screw threaded gear.

5. A propeller control mechanism comprising a screw threaded stationary sleeve, a screw threaded gear member to revolve and move longitudinally on said screw threaded stationary sleeve, a screw threaded shaft revolubly mounted and disposed parallel to said screw threaded stationary sleeve, a screw threaded nut adapted to move longitudinally along said screw threaded shaft, and drive a gear pinion slidably mounted on said screw threaded shaft, said pinion adapted to revolve and move longitudinally of its axis in predetermined relation to said screw threaded gear, and means for automatically locking and releasing said screw shaft, gear pinion, and gear member in any adjusted position, for the purpose described.

6. In a propeller control mechanism, the combination of a stationary member, a propeller shaft therefor, a propeller having adjustable blades mounted on said shaft, a bracket member rigidly secured to said stationary member, said bracket member having a screw threaded sleeve integral therewith, a gear member having a screw threaded hub adapted to revolve and move longitudinally of its axis on said screw threaded sleeve, a revoluble ring mounted on and movable longitudinally with said gear member, anti-friction bearings therefor, connections from said revoluble ring to said adjustable blades, a screw threaded shaft rotatably mounted in an extension of said bracket member and disposed parallel to said screw threaded sleeve, a gear pinion having a bore with a key adapted to engage a keyway in said screw shaft, said gear pinion slidably mounted on said screw shaft and meshing with said gear member, a screw threaded nut movable longitudinally on said screw shaft, keyways in said bracket extension restraining said nut from revolving, said nut abutting against said gear pinion to cause said gear pinion to move longitudinally and rotate with said screw shaft, and means for operating said screw shaft for the purpose described.

7. In a propeller control mechanism, a screw threaded stationary sleeve, a gear member threaded thereon to revolve and move longitudinally on rotation, a screw threaded shaft revolubly mounted and parallel with said stationary sleeve, a yoke member about said shaft held from rotation therewith having a nut threaded thereon to communicate longitudinal movement to said yoke in the rotation of said screw threaded shaft, a pinion in said yoke splined on said screw threaded shaft to slide longitudinally there-over in the movement of said yoke, said pinion being in constant meshing relation with said first mentioned gear member, and a driver for said screw threaded shaft capable of operation from a remote point.

8. In a propeller control mechanism, a screw threaded stationary sleeve, a gear member threaded thereon to revolve and move longitudinally on rotation, a screw threaded shaft revolubly mounted and parallel with said stationary sleeve, a yoke member about said shaft held from rotation therewith having a nut threaded thereon to communicate longitudinal movement to said yoke in the rotation of said screw threaded shaft, a pinion in said yoke splined on said screw threaded shaft to slide longitudinally thereover in the movement of said yoke, said pinion being in constant meshing relation with said first mentioned gear member, a driver for said screw threaded shaft capable of operation from a remote point, and a two-way clutch between said driver and said screw threaded shaft, permitting operation of the latter from the driver in either direction, but preventing rotation in either direction of the driver by said screw threaded shaft.

9. A propeller control mechanism comprising a primary driven element, a secondary driven element, propeller adjusting means connected to one of said elements, means connecting said primary and secondary elements, means for driving one of said elements and means automatically locking said control mechanism in any adjusted position.

10. A propeller control mechanism comprising a primary driven element, a secondary driven element, propeller adjusting means connected to one of said elements, means connecting said primary and secondary elements, means for driving one of said elements and means for automatically locking said primary driven element in any adjusted position.

11. A propeller control mechanism comprising a primary driven element, a secondary driven element, propeller adjusting means connected to one of said elements, means connecting said primary and secondary elements, means for driving one of said elements and means for automatically locking said secondary driven element in any adjusted position.

12. A propeller control mechanism comprising a primary driven element, a secondary driven element, propeller adjusting means connected to one of said elements, means connecting said primary and secondary elements, means for driving one of said elements, means automatically locking said controlling mechanism and means for automatically releasing said control mechanism.

13. A propeller control mechanism comprising a primary driven element, a secondary driven element, propeller adjusting means connected to one of said elements, means connecting said primary and secondary elements, means for driving one of said elements, means automatically locking said primary driven element and means for automatically releasing said primary driven element.

14. A propeller control mechanism comprising a primary driven element, a secondary driven element, propeller adjusting means connected to one of said elements, means connecting said primary and secondary elements, means for driving one of said elements, means automatically locking said secondary driven element and means for automatically releasing said secondary driven element.

In testimony whereof I affix my signature.

ERNEST G. McCAULEY.